(12) United States Patent
Song et al.

(10) Patent No.: US 6,428,827 B1
(45) Date of Patent: *Aug. 6, 2002

(54) LONG FLAVOR DURATION RELEASING STRUCTURES FOR CHEWING GUM AND METHOD OF MAKING

(75) Inventors: Joo H. Song, Chicago, IL (US); Donald J. Townsend, Moores Hill, IN (US); James R. Maxwell, Chicago, IL (US)

(73) Assignee: Wm. Wrigley Jr. Company, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/540,383

(22) Filed: Mar. 31, 2000

Related U.S. Application Data

(60) Provisional application No. 60/127,439, filed on Apr. 1, 1999.

(51) Int. Cl.$^7$ ............................. A23G 3/30; A23L 1/21
(52) U.S. Cl. ............................................ 426/3; 426/650
(58) Field of Search .................... 426/3, 650, 5; 424/48, 440; 106/172.1, 181.1; 536/84

(56) References Cited

U.S. PATENT DOCUMENTS

| | | | |
|---|---|---|---|
| 2,290,120 A | 7/1942 | Thomas | |
| 2,596,852 A | 5/1952 | Heggie | |
| 2,886,446 A | 5/1959 | Kramer et al. | |
| 3,085,048 A | 4/1963 | Bush | |
| 3,795,744 A | 3/1974 | Ogawa et al. | |
| 3,818,107 A | 6/1974 | Yolles | 426/3 |
| 3,826,847 A | 7/1974 | Ogawa et al. | 426/3 |
| 3,962,463 A | 6/1976 | Witzel et al. | 426/5 |
| 4,063,018 A | 12/1977 | Ohnaka et al. | 536/98 |
| 4,159,316 A | 6/1979 | Januszewski et al. | 424/49 |
| 4,217,368 A | 8/1980 | Witzel | 426/5 |
| 4,230,687 A | 10/1980 | Sair et al. | 424/22 |
| 4,259,355 A | 3/1981 | Marmo et al. | 426/5 |
| 4,460,563 A | 7/1984 | Calanchi | 424/35 |
| 4,525,585 A | 6/1985 | Taguchi et al. | 536/98 |
| 4,564,529 A | 1/1986 | Watson et al. | 426/570 |
| 4,590,075 A | 5/1986 | Wei et al. | 426/5 |
| 4,680,323 A | 7/1987 | Lowey | 524/43 |
| 4,695,463 A | 9/1987 | Yang et al. | 424/440 |
| 4,765,991 A | 8/1988 | Cherukuri et al. | 426/3 |
| 4,766,012 A | 8/1988 | Valenti | 424/461 |
| 4,777,050 A | * 10/1988 | Vadino | 424/468 |
| 4,810,501 A | 3/1989 | Ghebre-Sellassie et al. | 424/469 |
| 4,883,537 A | 11/1989 | Burdick | 106/194 |
| 4,978,537 A | 12/1990 | Song | 426/5 |
| 4,980,177 A | 12/1990 | Cherukuri et al. | 426/3 |
| 5,098,715 A | 3/1992 | McCabe et al. | 424/479 |
| 5,108,762 A | 4/1992 | Broderick et al. | 426/5 |
| 5,128,155 A | 7/1992 | Song et al. | 426/5 |
| 5,139,794 A | 8/1992 | Patel et al. | 426/3 |
| 5,154,927 A | 10/1992 | Song et al. | 424/440 |
| 5,154,939 A | 10/1992 | Broderick et al. | 426/5 |
| 5,165,944 A | 11/1992 | Song et al. | 426/5 |
| 5,192,563 A | 3/1993 | Patel et al. | 426/5 |
| 5,198,251 A | 3/1993 | Song et al. | 426/5 |
| 5,227,182 A | 7/1993 | Song et al. | 426/5 |
| 5,326,574 A | 7/1994 | Chapdelaine et al. | 426/5 |
| 5,364,627 A | 11/1994 | Song | 426/548 |
| 5,424,081 A | 6/1995 | Owusu-Ansah et al. | 426/4 |
| 5,458,891 A | 10/1995 | D'Amelia et al. | 426/50 |
| 5,496,541 A | 3/1996 | Cutler | 424/50 |
| 5,549,917 A | 8/1996 | Cherukuri et al. | 426/96 |

FOREIGN PATENT DOCUMENTS

| | | |
|---|---|---|
| EP | 0 221 850 A2 | 5/1987 |
| EP | 0 320 522 A1 | 6/1989 |
| EP | 0 393 510 A1 | 10/1990 |
| EP | 0 427 796 B1 | 5/1991 |
| EP | 0 437 360 A1 | 7/1991 |
| EP | 0 492 981 B1 | 7/1992 |
| EP | 0 543 572 A1 | 5/1993 |
| EP | 0 550 067 | 7/1993 |
| WO | WO 85/02092 | 5/1985 |
| WO | WO 87/03453 | 6/1987 |
| WO | WO 93/19621 | 11/1993 |
| WO | WO 94/01002 | 1/1994 |
| WO | WO 94/14330 | 7/1994 |
| WO | WO 95/23519 | 9/1995 |
| WO | WO 95/27826 | 7/1998 |

* cited by examiner

*Primary Examiner*—Arthur L. Corbin
(74) *Attorney, Agent, or Firm*—Steven P. Shurtz; Brinks Hofer Gilson & Lione

(57) ABSTRACT

The present invention provides methods and compositions for improving the flavor duration in chewing gum. In a preferred form, the present invention provides matrix compositions comprising a hydroxypropylcellulose cross-linked with a multi-functional carboxylate to yield a matrix having a lower water solubility than the original cellulosic material. This matrix may be ground up, have a flavor incorporated therein and used in gum compositions in which it facilitates a prolonged release of the flavoring.

30 Claims, 1 Drawing Sheet

LONG FLAVOR DURATION RELEASING STRUCTURES FOR CHEWING GUM AND METHOD OF MAKING

REFERENCE TO EARLIER FILED APPLICATION

The present application claims the benefit of the filing date under 35 U.S.C. §119(e) of provisional U.S. Patent Application Serial No. 60/127,439, filed Apr. 1, 1999, which is hereby incorporated by reference.

FIELD OF THE INVENTION

The present invention relates to flavoring of chewing gum. More particularly, the present invention describes methods and compositions for providing a long flavor duration in chewing gum.

BACKGROUND OF THE INVENTION

Chewing gums typically contain many ingredients including flavor ingredients, sweetener ingredients and flavor-enhancing ingredients. It is often desirable to produce a chewing gum having a high degree of sweetness and flavor, which lasts for an extended period of time. "Fast release" chewing gums known in the art typically release their flavor and sweetness compounds rapidly, creating an initial burst of high intensity sweetness and flavor which is pleasing to the consumer but which does not last. Conversely, "slow-release" chewing gums release their sweetness and flavor over a longer period of time but do not provide an initial burst of high intensity sweetness and flavor. Hence, chewing gum manufacturers are constantly trying to extend the time in which consumers can enjoy the sweetness and flavor of chewing gum without sacrificing the quality of the initial sweetness and flavor impact.

Various methods and compositions have been described for providing better control of the release of flavoring agents and increasing the length of flavor duration. For example the art describes the encapsulation of flavoring agents and other active ingredients into matrices. Examples of such matrices are disclosed in, for example, U.S. Pat. Nos. 4,978,537; 2,290,120; 2,596,852; 3,085,048; 3,795,744; 3,826,847; 3,818,107; 3,962,463; 4,217,368; 4,259,355; 3,962,463; 4,217,368; 4,259,355; 4,230,687; 4,590,075 and 5,128,155 and PCT Patent Publication No. WO 98/27826 (each of which is incorporated herein by reference). These patents are discussed in further detail herein below.

U.S. Pat. No. 4,978,537 discloses gradual release structures formed by meltspinning a mixture of an active agent and a wall material. U.S. Pat. No. 2,290,120, discloses the mixing of particles of chewing gum base with the flavoring agent to provide a substantially homogeneous mixture.

U.S. Pat. No. 2,596,852 discloses chemically reacting the chewing gum base with molecules of flavor ingredient, wherein the chewing gum base is a vinyl acetate polymer and the flavor molecule contains an ethylenic bond. U.S. Pat. No. 2,886,446, discloses the coacervation of a typically volatile, water immiscible flavoring oil within a body of gelatin. U.S. Pat. No. 3,085,048 discloses a process for coating dicalcium phosphate with sugar. U.S. Pat. Nos. 3,795,744, and 3,826,847 disclose the coating, encapsulation or combination of flavoring agents with high molecular weight compounds including starches, cellulose, proteins, gums, polyvinyl alcohol and polyvinyl esters. U.S. Pat. No. 3,818,107, discloses flavoring agent appended to a polymer backbone, releasable upon hydrolysis.

U.S. Pat. No. 3,962,463 discloses the encapsulation of flavor ingredients in gelatin waxes, polyethylene and the like followed by the depositing of the encapsulated flavor particles on the surface of the chewing gum. U.S. Pat. No. 4,217,368 discloses the controlled release of a (second) sweetener which is dispersed in, enveloped by, trapped in and otherwise protected by the gum base. A first sweetener, which is relatively unprotected, provides an initial burst of flavor. U.S. Pat. No. 4,259,355 discloses a hydrolytically releasable flavor oil entrapped in gelatine, dextrin, gum acacia or modified food starch with the aid of a hydroxypropylcellulose solid suspending agent. A hydrophobic unconfined flavor oil provides an initial burst of flavor.

U.S. Pat. No. 4,230,687 discloses the encapsulation of flavoring agent in a polymeric medium using rigorous and intimate conditions of mechanical shear to mix the flavoring agent with the encapsulating medium. The flavoring agent is gradually released from the encapsulating matrix at a rate dependent upon the rate of hydration of the matrix, which in turn depends upon the particular matrix used. The polymeric matrix may be derived from natural substances such as casein, a gelatin, modified starches, gums and related materials.

U.S. Pat. No. 4,590,075 discloses a flavor and sweetener delivery system including a flavoring agent and/or sweetener encapsulated in an elastomeric matrix. The elastomeric matrix is substantially hydrophobic and includes an elastomer, an elastomer solvent, a wax system and an excipient. The excipient, which is present only in small amounts, can include carbohydrate materials (including partially hydrolyzed starch), polyhydric alcohols, and mixtures of carbohydrates and polyhydric alcohols.

Despite this substantial body of work, there remains a deficiency in the art in that the duration and intensity of flavor can not be sustained for long periods of time. A matrix material that has attracted interest for its ability to improve flavor characteristics of gum is hydroxypropylcellulose (hereinafter referred to as HPC). U.S. Pat. No. 5,128,155 (specifically incorporated herein by reference) describes HPC compositions with silica and plasticizers as flavor cores for chewing gum. In these compositions, the silica was thought to be necessary and sufficient to act as a flavor reservoir material. PCT Publication WO 98/27826 suggests that low levels of HPC may be useful in increasing the amount of flavor released from chewing gum. For these compositions to be useful it was necessary to incorporate the HPC directly into the gum composition, as opposed to being premixed with another ingredient or used as an encapsulant or agglomeration agent. Furthermore, the HPC had to be present in concentrations of less than 1% if the gum integrity was to be maintained.

Clearly, the prior art demonstrates that there is a need for increasing the flavor duration and intensity in chewing gum compositions. While this need has been partly met, further improvements would be a great benefit. The present invention is directed toward methods and compositions overcome this deficiency in the prior art.

BRIEF SUMMARY OF THE INVENTION

There is a need in the art to improve the flavor duration and/or intensity of chewing gum. The present invention is directed towards addressing this need. The present invention provides methods and compositions that improve the duration of flavor in chewing gum without compromising the integrity of said gum or flavor. This beneficial outcome is preferably achieved by using novel high molecular weight HPC matrices.

In particular, the present invention provide a method of making a long flavor duration releasing structure for chewing gum comprising mixing a cellulose material having hydroxyl groups thereon with a multi-functional carboxylate to form a generally homogeneous composition; treating the composition to a curing temperature for a sufficient amount of time to form a matrix having a low water solubility; sizing the matrix to a size to be used in chewing gum compositions; and incorporating flavoring agents into the matrix.

Other aspects of the present invention provides a long flavor duration releasing structure comprising a cellulose material with hydroxyl groups thereon mixed with a cross-linking agent and cured to form a matrix having a low water solubility, and a flavoring agent incorporated into the matrix.

Also contemplated herein is a chewing gum composition with long flavor duration comprising a gum base; a water soluble bulk portion; and a flavor releasing structure comprising:

i) a matrix formed by mixing an aqueous solution containing hydroxypropylcellulose with an aqueous solution containing a cross-linking agent and evaporating water from the mixture; and ii) a flavor agent incorporated into the matrix.

Yet another aspect of the present invention provides a method of making a chewing gum composition with a long flavor duration comprising the steps of mixing a cellulose material having hydroxyl groups thereon with water until the cellulose material is hydrated; drying the water from the cellulose material; curing the cellulose material for a time period of at least 4 hours and at a temperature of at least 120° C. to form a matrix having a lower water solubility than the original cellulosic material; sizing the matrix to a size useful as an ingredient in chewing gum; incorporating flavor into the matrix; and mixing the matrix with flavor incorporated therein with a gum base and a bulking agent to form the chewing gum composition.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The following drawing forms part of the present specification and is included to further demonstrate certain aspects of the present invention. The invention may be better understood by reference to this drawing in combination with the detailed description of specific embodiments presented herein.

DETAILED DESCRIPTION OF THE PREFERRED EMBODIMENTS OF THE INVENTION

Figure 1:
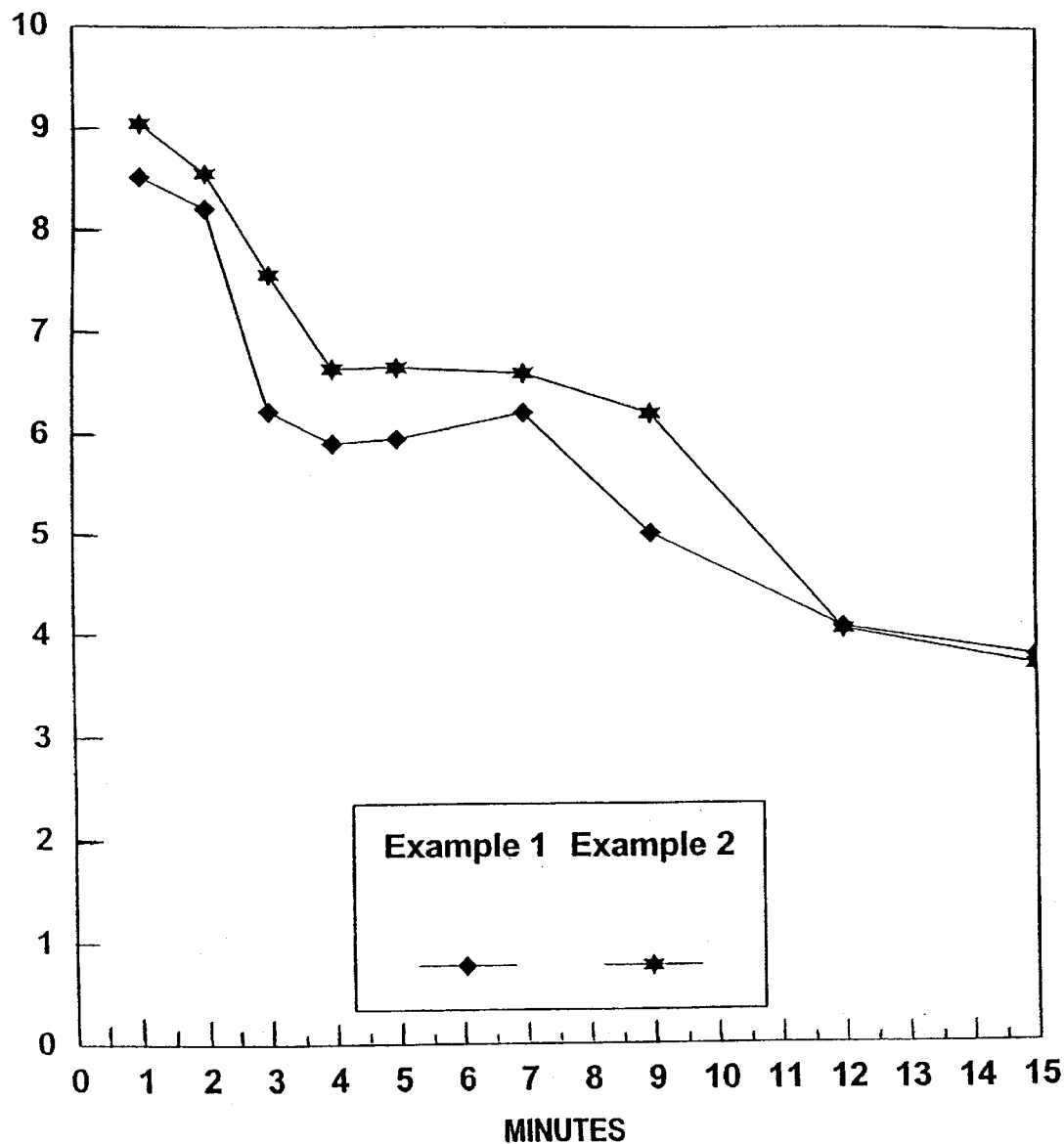
FIG. 1 is a graph comparing flavor intensity throughout most of the chewing period for the preferred matrix of the present invention and previously made flavored cores.

There is a need in the art to provide methods and compositions for increasing the duration and intensity of flavor in chewing gum. The present invention addresses this need by providing methods and compositions that prolong the flavor duration of chewing gum. More particularly, the inventors have demonstrated that it is possible to produce a long flavor duration releasing structure by preparing a homogeneous composition of a hydroxycellulose material with a multi-functional carboxylate and mixing the two ingredients in water, blending, drying, and curing the composition to form a matrix that has a low water solubility. This matrix can then sized and flavored as desired. The methods and compositions for producing this beneficial matrix are described in greater detail herein below.

As used herein, the term "curing" means treating the composition to sufficiently high temperatures to allow the composition to adopt a solid configuration that can be ground. In order to test whether the matrix composition has been sufficiently cured, a "wet finger" test can be performed. If the cured composition is wetted on the fingers and the matrix appears to dissolve and give a wet, slimy feel, the composition has not been fully cured. If the matrix is properly cured, it will not appreciably dissolve in water, nor will a slimy film form when handling the matrix with wet fingers. Such a suitably cured composition is said to have a "low water solubility" as used herein. The following description provides exemplary matrix components, flavorings and other gum components, and methods of producing the cured matrix and using it in the manufacture of chewing gum compositions.

Matrix Components

The present invention provides methods and compositions relating to improved flavor duration in chewing gum. The inventors have found that using a hydroxycellulose, and more particularly HPC, in flavor cores improves the duration of flavor in chewing gum. Previous flavor cores used HPC with silica and plasticizers to make the flavor cores. High MW HPC gave longer flavor duration and low MW HPC gave short flavor duration. High MW HPC materials also gave a narrow release time with a strong release of flavor. However, at high usage levels in the gum, the HPC materials caused the gum to have a slimy texture. As a result, the amount of flavor which could be added to the gum using these cores had a practical limit. An even higher MW HPC for even longer flavor duration would be desired, but this type of material is not available as a food grade product. A mixture of HPC and sodium carboxymethyl cellulose (hereafter referred to as sodium CMC) when dried and cured was found to give a new matrix material. When flavor was absorbed onto this matrix material, the material gave a good, broad flavor profile, and a longer duration time. Also there was no slimy texture when flavor was released as with the high levels of the previous high MW HPC.

The HPC/CMC matrix formed by the process noted below may or may not be a cross-linked material. The matrix may be due to a physical phenomenon or may be cross-linked. Analysis of the matrix by various methods has not demonstrated that the matrix is cross-linked. However, cross-linking may be very insensitive to these analysis and the cross-linking level may be too low to be detected. Also, any cross-linking may be breaking down during analysis of the matrix or during its shelf life. The analysis may actually be of the breakdown products which are HPC and sodium CMC. In theory, the HPC and sodium CMC materials may be cross-linked to give this newly structured matrix. This matrix can give the properties of a very high molecular weight HPC and modify the flavor profile and delay release.

A maximum level of about 5% to about 10% by weight of sodium CMC to about 90% to about 95% HPC should be sufficient to obtain the new product matrix. Generally, the matrix may be formed by mixing the two ingredients in water, blending, drying, and curing at high temperature. To expedite production for full scale production of this matrix, the matrix may be extruded, since this would give faster drying and allow for faster and easier manufacture. In this case, the matrix ingredients may be blended with a lubricant such as water, alcohol, and mixtures thereof. The following section provides a more detailed discussion of the matrix components and production.

a. HPC

In specific embodiments of the present invention hydroxycellulose compositions are employed as part of a matrix core to form flavor reservoirs. An exemplary cellulosic material that is preferred for this purpose is cellulose 2-hydroxypropyl ether, which is called hydroxypropylcellulose. This material is sold by Aqualon Co., a subsidiary of Hercules Inc., under the trademark Klucel®.

Hydroxypropylcellulose is available in different molecular weights. Varying the molecular weight may affect the release characteristics of the cores. For example, Klucel HF has a molecular weight of about 1,150,000 and Klucel EF has a molecular weight of about 80,000. Thus, it will be possible to chose HPC compositions that will produce high or very high MW matrices when cross-linked or treated according to the methods of the present invention.

Although HPC is the preferred cellulosic material for use in the present invention, it is contemplated that other cellulosic materials also will be useful. Various grades of HPC are commercially available to those of skill in the art, for example, Klucel HFF is food-grade and Klucel HF is cosmetic grade. Preferred embodiments employ Klucel HFF.

In preferred embodiments, the present invention provides an HPC matrix for use as a flavor duration enhancer in chewing gum compositions. In particularly preferred embodiments, the chewing gum composition comprise between about 0.1% to about 4% HPC. In specific embodiments, it is contemplated that the HPC content of the chewing gum composition may be about 1.98%. Of course it is contemplated that the HPC content of the chewing gum composition may of any other range such as between about 0.5% to about 2%; between about 0.75% to about 1.5%; and between about 1% to about 2% of the chewing gum composition. It is of interest to note that in the prior art a 1% HPC content in gums resulted in a loss of integrity of the gum composition (WO 98/27826). It has previously been noted that the presence of 1% HPC resulted in a gum with an undesirable slimy texture.

b. Sodium CMC

To form a cross-linked HPC matrix, a small amount of a cross-linking agent is needed; this cross-linking agent preferably is a multi-functional carboxylate. As used herein the term "multi-functional carboxylate" refers to a compound that contains two or more carboxylic acid moieties or salts thereof.

The carboxyl groups react with the hydroxyl groups from HPC and when water is removed may give a cross-linked HPC. Although it is desirable that sodium CMC is used as the cross-linking agent, other types of materials such as various organic acids also may be effective as cross-linking agents. Indeed it may be that in the curing process employed herein, the HPC may be able to cross-link with itself forming HPC multimers and thereby forming a matrix without the need for additional cross-linkers.

As is well known, sodium CMC has long been manufactured in industry and has been applied in a variety of uses, such as paste or thickening agent. Such uses for sodium CMC are well known to those of skill in the art and are described in for example, U.S. Pat. Nos. 4,063,018; 4,883, 537 and 4,525,585 (each incorporated herein by reference).

In addition to sodium CMC, other multi-functional carboxylate groups include but are not limited to adipic acid, malic acid, citric acid and the like. Of course, mixtures of these acids also may be employed. It is understood that it will be necessary to ensure that the multi-functional carboxylate composition is of a food-grade quality. Food-grade sodium CMC is readily available and well known to those of skill in the art. A particularly preferred sodium CMC is type 7H3SF which is available from by Aqualon Co., a subsidiary of Hercules Inc.

In preparing the matrix of the present invention, it is contemplated that the sodium CMC (or other cross-linking agent) may comprise between about 1% up to about 10% of the matrix relative to the HPC content. It is therefore contemplated that the composition in certain embodiments may comprise any range of sodium CMC concentration between this range, thus, in certain embodiments the sodium CMC concentration may be between about 2% and about 8%; in other embodiments the range may be between about 4% and about 6%; and in particularly preferred embodiments the sodium CMC content is 5% of the matrix composition relative to the HPC content of the composition.

c. Preparation of the Matrix

It is believed that the following process gives a cross-linked HPC/CMC matrix, but there is the possibility that instead of cross-linked product, the process may just give a matrix with a mixture that gives the desired physical properties possibly due to hydrogen bonding.

In an exemplary embodiment presented herein, the matrix is prepared by adding a solution containing 11.35 g sodium CMC to a solution containing 215.65 grams of high molecular weight HPC. The HPC is dissolved in cold water and sodium CMC is dissolved in hot water. More particularly, 215.65 grams of Klucel HFF are add to 4 liters of distilled water at room temperature and mixed in a Hobart mixer for 2 hours. Concurrently, 11.35 grams of sodium CMC, type 7H3SF. are slowly added to 900 ml of distilled water at 70° C. while stirring and mixed for 2 hours. Then the sodium CMC solution is slowly added to the HPC solution in the Hobart mixer while mixing at slow speed and mixed for an additional 4 hours. Although the specific example provided herein employs 11.35 grams sodium CMC:215.56 grams HPC, it is understood that given the teachings of the present invention, one of skill in the art will be able to use more or less sodium CMC and/or HPC to arrive at a matrix composition that will be useful as described herein.

Once the sodium CMC solution has been uniformly incorporated into the HPC solution, the mixture is removed from the Hobart mixer, spread onto Teflon coated trays and placed in a forced air oven to be dried at a temperature of between about 20° C. and about 40° C. In particularly preferred embodiments, the drying temperature is 32° C. These layers are allowed to dry for approximately 6 hours, peeled off, turned over and allowed to dry at modest temperatures for a further 24 hours. This drying process removes any excess water. The inventors have discovered that for curing to occur properly, it is important to remove this excess water. Further, if this water is not removed at a low drying temperature, a phase separation occurs between the sodium CMC and HPC thereby resulting in a loss of integrity of the matrix.

Once the CMC/HPC layers have been dried they are cured at an appropriate temperature and time in a vacuum oven. For example, the layers are cured for between about 4 to about 48 hours at temperatures of between about 120° C. to about 250° C. Particular embodiments envision curing the layers for 24 hours at between about 125° C. to about 140°

C. Of course it is understood that this is an exemplary temperature range and any temperature between these two temperatures or any other temperature conventionally used to cure polymeric materials will be useful in this context of the invention. Thus it is understood that any such temperature may be employed so long as the integrity of the HPC/CMC matrix is maintained. As an alternative to drying in a vacuum oven, the matrix may be cured in a conventional oven using somewhat higher temperatures. For example, the matrix may be cured at between about 140° C. and about 200° C. for 6–8 hours in a conventional oven. Again it is understood that these are merely exemplary conditions and one of skill in the art may cure the matrix at temperatures higher or lower than the 140° C. to 200° C. temperature in a conventional oven for a suitable period of time that the matrix is appropriately cured. One test for ensuring that the matrix is appropriately cured is to employ the wet finger test as described herein above. Once the matrix has been cured it can be ground into a powder, have flavor incorporated therein and added to the gum formulation. Preferably, the matrix is ground to a size wherein it will pass through a 20 mesh sieve.

While not being bound by any particular theory, the inventors suggest that the above mixing, drying and curing procedures may result in some type of bonding, which might give the properties of a cross-linked HPC matrix. It is also possible that this process gives a self cross-linked product, or that at the conditions given above, radicals may form within HPC, which may bound within the HPC molecule. Hydrogen bonding may also modify the physical properties of the cellulosic materials to give the desired properties. Another theory is that a mixed crystalline/amorphous matrix of HPC may form to give a lower solubility.

The HPC material may be dissolved in water, dried and cured under similar conditions as above without the presence of any other cross-linking agents to yield a matrix that may also act as a flavor absorbent core. The curing process that gives the HPC/CMC matrix its desirable properties may also give the cured HPC matrix similar properties such as lower water solubility, and the HPC matrix may similarly pass the wet finger test. Flavors may then be absorbed onto the cores at levels as high as 40-60% and the flavor/core matrix can then be added to a chewing formulation to obtain longer lasting flavor.

If molecular blending was not necessary between HPC and CMC or with HPC by itself, it may be possible that less water may be needed to obtain a cured HPC with the desired properties. The advantage would be that less drying would be needed which could significantly reduce processing time. The amount of water to be used may be as low as 1 part water to 9 parts HPC or even as low as 1 part water to 19 parts HPC. Sufficient water should be provided to mobilize the HPC molecules such that the HPC molecules have more of a chance to recombine with neighboring molecules to alter the physical structure and solubility of HPC. However, it should be noted that drying and curing HPC by itself without a sufficient amount of water is not expected to have a significant effect.

Manufacture of Chewing Gum

The long flavor duration release structures of the present invention can be used in typical chewing gum compositions. In general, a chewing gum composition typically comprises a water soluble bulk portion added to the water insoluble chewable gum base portion. The flavoring agents are typically water insoluble. The water soluble portion dissipates with a portion of the flavoring agent over a period of time during chewing, while the bum base portion is retained in the mouth throughout the chew.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum.

Sugar sweeteners generally include saccharide containing components commonly known in the chewing gum art which comprise but are not limited to sucrose, dextrose, maltose, dextrin, dried invert sugar, fructose, levulose, galactose, corn syrup solids, and the like, alone or in any combination. Non-sugar sweeteners can include sorbitol, mannitol, and xylitol.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent is typically added with the final portion of the bulking agent.

The entire mixing procedure typically takes about fifteen minutes, but longer mixing times may sometimes be required. Those skilled in the art will recognize that many variations of the above-described procedure may be followed.

The flavoring agent can be added after formation of the matrix and grinding to form flavor cores of a desirable size by soaking the cores in a beaker of flavoring agent. Another method of adding flavoring agent is by misting the flavoring agent over the cores. Although these methods will work, it is preferred to obtain as homogeneous a distribution of the flavoring agent in the cores as is possible. One such way to obtain a homogeneous distribution is by using a Vee mixer. The Vee mixer has nozzles that mists the flavoring agent over the cores as they are tumbled. Vee mixers can be obtained from Patterson Industries (Canada) Limited. A Cone Shell Blender is another type of mixer that will achieve the desired uniform distribution of flavoring agent in the core. Although in most cases the flavoring agent will be absorbed into the cores very rapidly, it is desirable to allow the cores to mix for a sufficient time to reach equilibrium.

The flavoring agent is releasably retained by the cores, to the extent that it is released when gum containing the flavor releasing structures is chewed. Additionally, different and multiple flavoring agents may be used in a single core. The cores can contain very large amounts of flavoring agent. For example, cores have been made that contained as much as 40 to 60% flavoring agent based on the total weight of the core. Although 33% loading, based on the total weight of the core is presently preferred. The higher the loading the faster the flavoring agent will be released from the core, all other factors being equal.

Flavorings And Other Gum Components

Flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring agents are also contemplated. Those skilled in the art will recognize that natural and artificial flavoring agents may be combined in any sensorially acceptable blend. All such flavors and flavor blends are contemplated by the present invention, including by way of example, peppermint, spearmint, wintergreen, cinnamon, menthol, eucalyptus, and other fruit and citrus flavorings. Besides the flavored cores, additional flavor may be added to the chewing gum composition by conventional means.

Once the flavoring agent is retained in the core, the core can optimally be coated with a flavor barrier coating. The coating increases the shelf life of the flavor releasing structure when it is incorporated into a chewing gum. The coating also aids in handling and processing the cores by preventing the flavor from evaporating. The coating can prevent the flavor from migrating into the gum and can protect chemically sensitive flavoring agents from reacting with the ingredients of the gum. The coating can also affect the release rate of the flavoring agent. Generally, any natural or synthetic material that exhibits a flavor barrier characteristic can be used for the coating.

Once the flavor releasing structure has been formed, it is then incorporated into a chewing gum. Addition to the gum mixer during the last stage of the mixing cycle is preferred to minimize any damage to the flavor releasing structures.

Chewing gum consists of a gum base to which a water soluble bulk portion may normally be added. Chewing gum bases generally comprise a combination of elastomers and resins together with plasticizers and inorganic fillers.

The gum base may contain natural gums and/or synthetic elastomers and resins. Natural gums include both elastomers and resins. Suitable natural gums include, but are not limited to chicle, jellutong, sorva, nispero tunu, niger gutta, massaranduba belata, and chiquibul.

When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, a copolymer form Exxon Corp. under the designation "butyl rubber," and the like.

The amount of elastomer used in the gum base can typically be varied between about 10 and about 20 percent depending on the specific elastomer selected and on the physical properties desired in the final gum base. For example, the viscosity, softening point, and elasticity can be varied.

Resins used in gum bases may include polyvinylacetate, polyethylene, ester gums, (resin esters of glycerol), polyvinylacetate polyethylene copolymers, polyvinylacetate polyvinyl laureate copolymers, and polyterpenes. As with the elastomer, the amount of resin used in the gum base can be varied depending on the particular resin selected and on the physical properties desired in the final gum base.

Preferably, the gum base also includes plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. Additionally, mixtures of the plasticizers may be used such as a mixture of paraffin wax, partially hydrogenated vegetable oil, and glycerol monostearate.

Preferably, the gum base also includes a filler component. The filler component is preferably selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

Further, gum bases may also contain optional ingredients such as antioxidants colors, and emulsifiers.

These ingredients of the gum base can be combined in a conventional manner. In particular, the elastomer, resins, plasticizers, and the filler are typically softened by heating and then mixed for a time sufficient to insure a homogenous mass. The mass can be formed into slabs, or pellets and allowed to cool before use in making chewing gum. Alternatively, the molten mass can be used directly in a chewing gum making process.

Typically, the gum base constitutes between about 5 to about 95 percent by weight of the gum. More preferably the insoluble gum base comprises between 10 and 50 percent by weight of the gum and most preferably about 20 to about 35 percent by weight of the gum.

Examples

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The following protocol provides an exemplary methods for making the HPC/CMC matrices of the present invention. Of course it is understood that this is merely an exemplary protocol and that one of skill in the art will readily be able to adapt the weights, temperatures and times used in the procedure and still arrive at a matrix that will be useful in the present invention.

1. Weigh 215.65 grams of Klucel HFF (high MW HPC) and add to 4 liters of distilled water at room temperature and mix in a Hobart mixer for 2 hours.
2. Weigh 11.35 grams of sodium carboxylmethylcellulose (sodium CMC), type 7H3SF, and slowly add to 900 ml of distilled water at 70° C. while stirring and mix for 2 hours.
3. Add sodium CMC solution slowly to HPC solution in the Hobart mixer while mixing at slow speed and mix for an additional 4 hours.
4. Remove HPC/CMC mix from Hobart and spread on Teflon coated trays and place materials in forced air oven at 90° F.
5. Allow to dry for 6 hours, peel off partially dried mixture and turn over and dry 24 hours.
6. This material is then dried and cured for 24 hours at 125 to 140° C. in a vacuum oven and ground.

The inventors believe that this process facilitates a cross-linking between HPC and sodium CMC. However, it may be that this process gives a self cross-linked product, or that at the conditions given above, radicals may form within HPC, which may bound within the HPC molecule.

In order to determine if the HPC and sodium CMC polymers are properly cured a preliminary test may be performed. When wetted on the fingers, the polymers will appear to dissolve and give a wet, slimy feel. If the polymers are properly cured, they will not dissolve in water, nor will a slimy film form on the fingers. These cured polymers will be solid and can be ground. This will allow this matrix to swell and adsorb flavors for use in gum. The process of the present invention yields a solid matrix that has a very low water solubility. Preferably, such a very low water solubility would be even lower than the water solubility of high MW HPC.

When the flavor is absorbed onto the matrix material, non-sticky solid particles are formed that swell in size. If too much sodium CMC is used, the cross-link density may be too high and not as much flavor may be absorbed. A low cross-link density is desired, so a low level of sodium CMC should be used, preferably less than about 10% of the HPC material and more preferably less than about 5% of the HPC material.

The flavor, such as a peppermint flavor blend, is mixed with the HPC/CMC matrix and allowed to set 3–4 hours. The particles remain as solid particles, but when swelled are soft particles, and can be added directly to a chewing gum formulation. In example 2 below, two parts of the HPC/CMC matrix with 5% sodium CMC was made and ground to less than 20-mesh, used as cores, and mixed with one part peppermint flavor and allowed to set for 4 hours. As a comparison, a HPC/silica/glycerol monostearate matrix in comparative Example 1 was made at a 60/20/20 ratio and mixed with peppermint flavor at a 2/1 ratio of core/flavor as described in PCT Patent Publication No. WO 94-14330 and used for comparison purposes. The following gum formula was used to make Examples 1 and 2.

| COMPONENT | PERCENTAGE CONTENT |
|---|---|
| Base | 18.75 |
| Sugar | 51.52 |
| 39 DE, 45.5 Be Syrup | 12.71 |
| Dextrose Monohydrate | 9.45 |
| Glycerin | 1.23 |
| Peppermint Flavor | 0.86 |
| Encapsulated Sweeteners | 3.26 |
| Lecithin | 0.24 |
| Polymer Core/Flavor Matrix | 1.98 |
| TOTAL % | 100.00 |

Examples 1 and 2 were compared in a blind test for flavor intensity by a 9 member panel and data are shown in the FIG. 1. Results show that the HPC/CMC matrix gave an improved flavor intensity throughout most of the chewing period compared to the previously made flavored cores. The comparison sample had previously shown an improved flavor release compared to standard products, which indicates the new HPC/CMC flavored matrix gives an even more improved flavor release. Also, when used at the level of about 2% HPC in the chewing gum composition, the flavor cores of comparative Example 1 produced a slimy texture. However, the use of 2% of HPC in the gum of Example 2 did not produce a slimy texture.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of making a long flavor duration releasing structure for chewing gum comprising:
   a) mixing a cellulose material having hydroxyl groups thereon with a multi-functional carboxylate to form a generally homogeneous composition dissolved in an aqueous solution;
   b) treating the composition at a curing temperature of at least 120° C. for a period of at least 4 hours to form a matrix having a low water solubility;
   c) sizing the matrix to a size to be used in chewing gum compositions; and
   d) incorporating flavoring agents into the matrix.

2. The method of claim 1 wherein the sizing step is performed by grinding the matrix.

3. The method of claim 1 wherein the step of incorporating flavor into the matrix occurs after the step of sizing the matrix.

4. The method of claim 1 wherein the cellulose material comprises hydroxypropylcellulose.

5. The method of claim 4 wherein the multi-functional carboxylate comprises sodium carboxymethylcellulose.

6. The method of claim 5 wherein the ratio of hydroxypropylcellulose to sodium carboxymethylcellulose is about 95:5.

7. The method of claim 5 wherein the hydroxypropylcellulose and sodium carboxymethylcellulose are each dissolved in water before being mixed together.

8. The method of claim 1 wherein the multi-functional carboxylate is selected from the group consisting of sodium carboxymethylcellulose, adipic acid, malic acid, citric acid and mixtures thereof.

9. The method of claim 1 wherein the cellulose material has an average molecular weight of between about 80,000 and about 1,150,000.

10. The method of claim 1 wherein the ratio of cellulose material to multi-functional carboxylate is between about 99:1 and about 9:1.

11. The method of claim 1 wherein the step of mixing includes distributing the cellulose material and the multi-functional carboxylate in a liquid medium.

12. The method of claim 1 wherein the step of mixing includes making a solution containing between about 1% and about 10% hydroxypropylcellulose, between about 0.1% and about 1.0% sodium carboxymethylcellulose, and between about 98.9% and about 89% water.

13. The method of claim 1 wherein the step of mixing includes blending the cellulose material and the multi-functional carboxylate together in a dry state and then dissolving the mixture in an aqueous solution.

14. The method of claim 1 wherein the composition is cured at a temperature of between about 120° C. and about 250° C.

15. The method of claim 1 wherein the composition is cured for a period of between about 4 and about 48 hours.

16. The method of claim 1 wherein the composition is cured for a period of at least 8 hours at a temperature of at least 135° C.

17. The method of claim 1 wherein composition is dried in a forced air oven at a temperature of between about 20° C. and about 40° C. before being cured.

18. The method of claim 1 wherein the composition before curing comprises between about 0.5% and about 5% water.

19. The method of claim 1 wherein the matrix is ground to a size of less than 20-mesh.

20. The method of claim 1 wherein the flavoring agent is incorporated into the matrix at a ratio of between about 0.05 and about 1 part flavoring agent to 1 part matrix.

21. The method of claim 1 wherein the flavoring agent is incorporated into the matrix at a ratio of about 2 parts matrix to 1 part flavoring agent.

22. The method of claim 1 wherein the composition is made in an extruder and cured thereafter.

23. The method of claim 22 wherein a lubricant is added to the composition to aid in the extrusion process.

24. The method of claim 23 wherein the lubricant is selected from the group consisting of water, alcohol and mixtures thereof.

25. A chewing gum composition containing a long flavor duration releasing structure comprising a matrix formed by mixing an aqueous solution containing hydroxypropylcellulose with an aqueous solution containing a multi-functional carboxylate cross-linking agent, evaporating water from the mixture to form a dried mixture and curing the dried mixture at a temperature of at least 120° C. for a period of at least 4 hours to form a matrix; and a flavor agent incorporated into the matrix, wherein the flavor releasing structure causes the flavoring agent to have an improved release upon chewing the gum during the time period between about 5 minutes after chewing begins and about 15 minutes after chewing begins compared to a standard product in which the flavor is mixed directly into the gum.

26. A chewing gum composition containing a long flavor duration releasing structure comprising a matrix formed by mixing an aqueous solution containing hydroxypropylcellulose with an aqueous solution containing a multi-functional carboxylate cross-linking agent, evaporating water from the mixture to form a dried mixture and curing the dried mixture at a temperature of at least 120° C. for a period of at least 4 hours to form a matrix; and a flavor agent incorporated into the matrix, wherein the flavor releasing structure comprises between about 0.1% and about 5% of the gum composition.

27. The chewing gum composition of claim 26 wherein the cross-linking agent comprises sodium carboxymethylcellulose.

28. A method of making a long flavor duration releasing structure comprising the steps of:
    a) mixing a cellulose material having hydroxyl groups thereon with water until the cellulose material is hydrated;
    b) drying the water from the cellulose material to form a dried cellulose material;
    c) curing the dried cellulose material for a time period of at least 6 hours and at a temperature of at least 125° C. to form a matrix having a lower water solubility than the original cellulosic material;
    d) sizing the matrix to a size useful as an ingredient in chewing gum, and
    e) incorporating flavor into the matrix.

29. A chewing gum composition containing a long flavor duration releasing structure comprising a cellulose material with hydroxyl groups thereon mixed with a cross-linking agent comprising a multi-functional carboxylate, the mixture being dissolved in an aqueous solution, and cured at a temperature of at least 120° C. for a period of at least 4 hours to form a matrix having a low water solubility; and a flavor agent incorporated into the matrix, wherein the flavor releasing structure comprises between about 0.1% and about 5% of the gum composition.

30. The chewing gum composition of claim 29 wherein some of the hydroxyl groups have reacted with the multi-functional carboxylate to make cross-links.

* * * * *